(12) United States Patent
Shin

(10) Patent No.: US 11,338,633 B2
(45) Date of Patent: May 24, 2022

(54) TOW HITCH INSERT AND COVER

(71) Applicant: Brian Shin, Los Angeles, CA (US)

(72) Inventor: Brian Shin, Los Angeles, CA (US)

( * ) Notice: Subject to any disclaimer, the term of this patent is extended or adjusted under 35 U.S.C. 154(b) by 0 days.

(21) Appl. No.: 17/208,242

(22) Filed: Mar. 22, 2021

(65) Prior Publication Data

US 2021/0206216 A1 Jul. 8, 2021

Related U.S. Application Data

(63) Continuation of application No. 16/235,887, filed on Dec. 28, 2018, now Pat. No. 10,960,722.

(60) Provisional application No. 62/611,318, filed on Dec. 28, 2017.

(51) Int. Cl.
*B60D 1/60* (2006.01)

(52) U.S. Cl.
CPC .............. *B60D 1/60* (2013.01); *B60D 1/605* (2013.01)

(58) Field of Classification Search
CPC .................................. B60D 1/60; B60D 1/605
See application file for complete search history.

(56) References Cited

U.S. PATENT DOCUMENTS

| | | | |
|---|---|---|---|
| 3,410,580 A | 11/1968 | Longenecker | |
| 3,780,546 A | 12/1973 | Longenecker | |
| 5,603,178 A | 2/1997 | Morrison | |
| 6,402,181 B1 | 6/2002 | Lee | |
| 6,418,650 B1 * | 7/2002 | Krewald | B60D 1/00 40/591 |
| 6,463,686 B1 * | 10/2002 | Eisenbraun | B60D 1/60 280/507 |
| 6,945,551 B2 | 9/2005 | Blake | |
| 7,889,062 B1 | 2/2011 | Albisa | |
| 2002/0033587 A1 * | 3/2002 | McConnell | B60D 1/60 280/504 |
| 2007/0182128 A1 * | 8/2007 | Moore | B60D 1/60 280/508 |
| 2007/0242471 A1 | 10/2007 | Campbell et al. | |
| 2010/0015367 A1 | 1/2010 | Mitchell | |

* cited by examiner

*Primary Examiner* — Gary C Hoge
(74) *Attorney, Agent, or Firm* — Heedong Chae; Lucem, PC

(57) ABSTRACT

The present invention is for a tow hitch insert assembly that allows for natural dangling and swinging motion of an elongated member from a trailer hitch. The elongated member can be of a variety of shapes and in one version is a replica of testicles. The elongated member is coupled to an insert tube main body by a rod that extends through the tow hitch insert assembly. Surrounding the rod are springs on each side, sandwiching the elongated member, which allows for oscillation of the elongated member within the tow hitch insert assembly. In another version, the elongated member is secured via a slotted plate, and the elongated member has a spheroid top wider than the slot of the slotted plate, which permits the elongated member to slide and rotate within the tow hitch insert assembly.

1 Claim, 5 Drawing Sheets

TOW HITCH INSERT AND COVER

CROSS-REFERENCE TO RELATED APPLICATIONS

This application is a continuation of U.S. patent application Ser. No. 16/235,887, filed on Dec. 28, 2018, to Brian Shin, which claims benefit of U.S. Provisional Patent Application No. 62/611,318, filed Dec. 28, 2017, the contents of each are incorporated by reference in their entireties.

FEDERALLY SPONSORED RESEARCH OR DEVELOPMENT

None.

FIELD OF THE DISCLOSURE

The present invention relates to parts for a hitch insert for a vehicle, and in particular, parts for a tow hitch insert and cover for a vehicle.

BACKGROUND OF THE INVENTION

Tow hitch inserts and covers are well known in the art. Many individuals use the tow hitch not for its intended purpose of attaching a load, but instead, use the hitch, insert and cover to attach a humorous article to entertain individuals driving behind the vehicle.

One such humorous article is that of replica bull testicles to make it appear that the vehicle has testicles dangling from the rear of the car body. However, merely attaching replica bull testicles or other ornamental structures to the hitch does not show the lifelike sway of a natural body part, and often are not secured well to the trailer hitch. Previously, in order to give the natural bouncing and dangling appearance of replica body parts, the consumer has had to attach articles using unsecured means, such as a wire that would thread through the top of article and connect to the vehicle by twisting the wire. However, thieves could easily cut or untwist the wire that connected articles to the vehicle.

There are many types of trailer hitch cover assemblies. U.S. Pat. No. 6,945,551 to Blake describes a trailer hitch cover assembly for a hitch receiver including a main body operatively connected to a hitch tube, and adapted to allow insertion of a hitch into the hitch tube. U.S. Pat. Nos. 3,780,546 and 3,410,580 to Longenecker describe types of locks that lock the insert cover to the trailer hitch assembly. A removable trailer hitch security system is described in U.S. Pat. No. 7,889,062 to Albisa. Another trailer hitch and lock assembly is described in U.S. Pat. No. 6,402,181 to Lee. Novelty items have also been placed on the rear of vehicles, such as "Golf Nuts" that dangle from the rear of a vehicle, as described in U.S. Patent Application No. 20100015367A1 to Mitchell. However, while many of the references above attempt to solve some needs of a user, they do not provide for a secure system that enables one to attach an elongated member, such as replica bull testicles, to be both secure and have the natural appearance of bouncing and dangling from the rear of a vehicle.

BRIEF SUMMARY OF THE PRESENT INVENTION

One general aspect includes a tow hitch insert assembly that can lock onto a trailer hitch to prevent theft. The tow hitch insert assembly has an insert tube main body with a proximal end, a distal end, a top side, a bottom side, and an insert tube main body aperture. The insert tube main body is adapted to fit within a hitch tube opening of a trailer hitch. The insert tube main body aperture is located near the distal end of the main body, and is adapted to allow passage of a lockpin therethrough, whereby the lockpin is operable to lock the tow hitch insert assembly to the trailer hitch. The tow hitch insert assembly also has an elongated member connected to the proximal end of the insert tube main body.

In one aspect, the elongated member has a top region, a bottom region, a right side, a left side, and a recess on the bottom region at least partially separating the right side from the left side. In another aspect, the elongated member resembles animal testicles.

In another aspect the insert tube main body has a proximal end, a distal end, and an insert tube main body aperture. The insert tube main body has an insert tube main body channel along a length of the insert tube main body. The insert tube main body is adapted to fit within a hitch tube opening of a trailer hitch. The insert tube main body aperture is adapted to allow passage of a lockpin therethrough, whereby the lockpin is operable to lock the tow hitch insert assembly to the trailer hitch. The tow hitch insert assembly also includes an elongated member connected to the proximal end of the insert tube main body, the elongated member having a aperture to fit the lockpin. The elongated member has a top region, a bottom region, a right side, and a left side. The tow hitch insert assembly also includes a rod disposed within the insert tube main body channel and also includes first spring member and a second spring member. The rod is disposed within the inner coils of the first spring member and second spring member. The first spring member and the second spring member sandwich the top region of the elongated member. The first spring member and the second spring member allow the elongated member to oscillate along the rod by providing springed force that allows the elongated member to slide along the rod, yet be pushed back toward the center of the rod, thereby giving an appearance of natural body part side-by-side, or forward-back movement to the elongated member.

In one aspect, the rod is a bolt extending through the insert tube main body and the bolt has a bolt head and a threaded region adapted to connect a nut operable to secure the bolt to the insert tube main body. The assembly may include at least one washer disposed along the bolt. The washer, or washers, may be disposed in a number of locations to help secure and dissipate force along parts of the assembly when tightened, including between the elongated member and the first spring member, the elongated member and the second spring member, the bolt head and the insert tube main body and/or the nut and the insert tube main body.

In one aspect, there may be a slot to permit the elongated member to pass through the insert tube main body along the bottom side of the insert tube main body.

In one aspect, the rod is disposed at least partially within the insert tube main body channel along a width of the insert tube main body. There may also be a panel within the insert tube main body operable to attach the rod to the panel.

In yet another aspect of the tow hitch insert assembly, the insert tube main body has a proximal end, a distal end, an insert tube main body aperture, and an insert tube main body channel along a length of the insert tube main body. The insert tube main body is adapted to fit within a hitch tube opening of a trailer hitch, and the insert tube main body aperture is adapted to allow passage of a lockpin. The elongated member is connected to the proximal end of the insert tube main body and has an aperture where the lockpin can be inserted. The elongated member has a top region, a bottom region, a right side, a left side, a spheroid top, and a neck below the spheroid top, the neck having a diameter narrower than a diameter of the spheroid top. The tow hitch insert assembly also includes plate adapted to fit within the insert tube main body channel, the plate having an opening adapted to fit the neck of the elongated member. The diameter of the spheroid top is larger than a width of the opening, thereby permitting rotational movement of the elongated member, but preventing the elongated member from falling through the opening. In one aspect, the plate is a slotted plate, and the opening is a slot, thereby permitting rotational movement of the elongated member and allowing the elongated member to slide along the slot.

In yet another aspect, the tow hitch insert assembly has a panel within the insert tube main body for attachment of the plate.

In yet another aspect, the tow hitch insert assembly has an insert tube main body cap adapted to attach to the insert tube main body, and cap the insert tube main body channel.

DETAILED DESCRIPTION OF EMBODIMENTS

Figure 1:
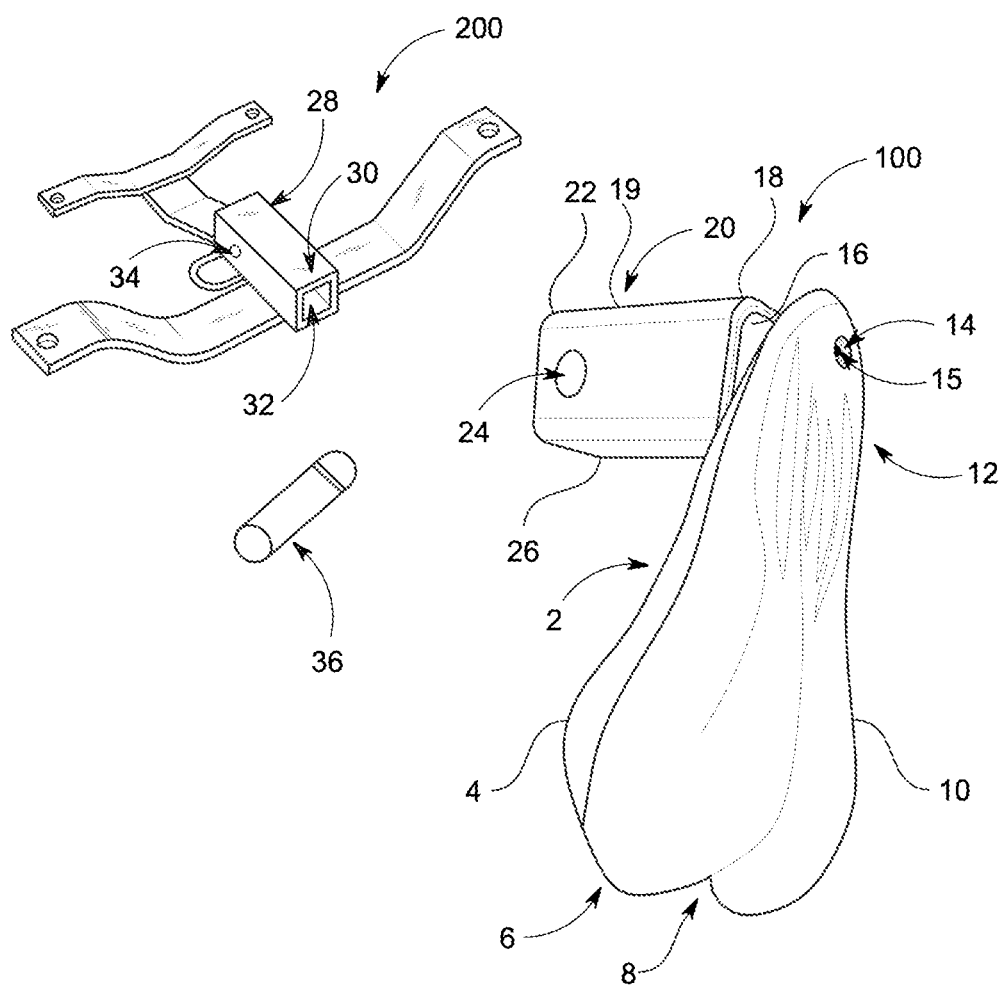
FIG. 1 is a perspective view of an embodiment of a tow hitch cover with a fixed elongated member capable of being inserted into a trailer hitch.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein.

Turning to the Figures to describe embodiments, FIG. 1 illustrates an embodiment where the tow hitch assembly 100 has an insert tube main body 20 fixed to elongated member 2. The tow hitch assembly in inserted into a trailer hitch assembly 200 that has a trailer hitch tube 28, a hitch tube insertion end 30 that has a hitch tube opening 32, and lockpin aperture 34. The tow hitch assembly is inserted into the hitch tube opening 32 and the insert tube main body aperture 24 is aligned with the lockpin aperture 34 of the trailer hitch assembly 200. To lock the insert tube main body 20 to the trailer hitch assembly 200, a lockpin 36 is inserted. Lockpins are well known in the art and a variety of lockpins can be used in the present embodiment, such as those described in U.S. Pat. No. 3,780,546 to Longenecker, U.S. Pat. No. 3,410,580 to Longnecker, and U.S. Pat. No. 6,402, 181 to Lee, each incorporated by reference in their entireties, for all purposes. As the insert tube main body 20 slides through the hitch tube, the lockpin aperture 34 of the hitch tuber aligns with the inert tube main body aperture 24. When aligned, the lockpin 36 can be inserted through both, and locked (such as by key or other means) so that the insert tube main body 20 cannot be removed from the hitch tube 28 without unlocking the lockpin 36.

Using lockpin with an elongated member 2 connected to an insert tube main body 20 is advantageous because when users attempt to attach elongated members to trailer hitch assemblies, they attach them with a wire that is not secure because it is not lockable. In the present embodiment, the elongated member is secured or coupled to the insert tube main body 20 through a coupling member 15, such as a screw, nail, bolt, or any means to connect one piece to another means. The coupling member 15 goes through the elongated member 2 at the elongated member aperture 14. One can also envision that the elongated member 2 is permanently attached, such as by welding, or other means.

The elongated member 2 can be of a variety of forms, but a form that consumers would appreciate is in the shape of testicles so that it appears that the vehicle has testicles dangling from the rear of the vehicle, which extend below the trailer hitch assembly 200 of a vehicle (not shown).

The elongated member 2 has a top region 12, a bottom region 6, a right side 10 and a left side 4. To give the appearance of testicles, there is a recess 8 on or along the elongated member 2 that at least partially separates the right side 10 of the elongated member 20 from the left side 4 of the elongated member 20.

Turning to the insert tube main body 20, the insert tube main body 20 has a proximal end 18, a distal end 22, a front side 16, a bottom side 26 and a top side 19. The elongated member 2 is attached to the proximal end 18 of the insert tube main body 20. In the embodiment of FIG. 1, the elongated member 2 is fixed and does not dangle or sway relative to the insert tube main body 20. In other embodiments described below, the elongated member 2 can move, swing, and/or rotate relative to the insert tube main body 20.

Figure 2:
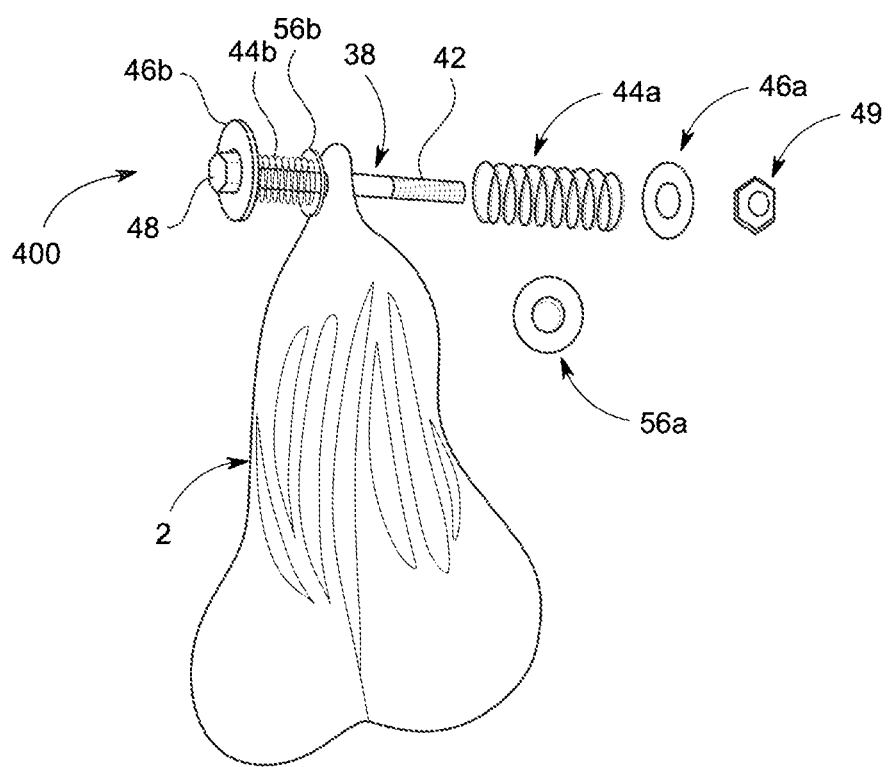
FIG. 2 is a partially exploded view of an elongated member connected to a spring assembly.
Figure 3:
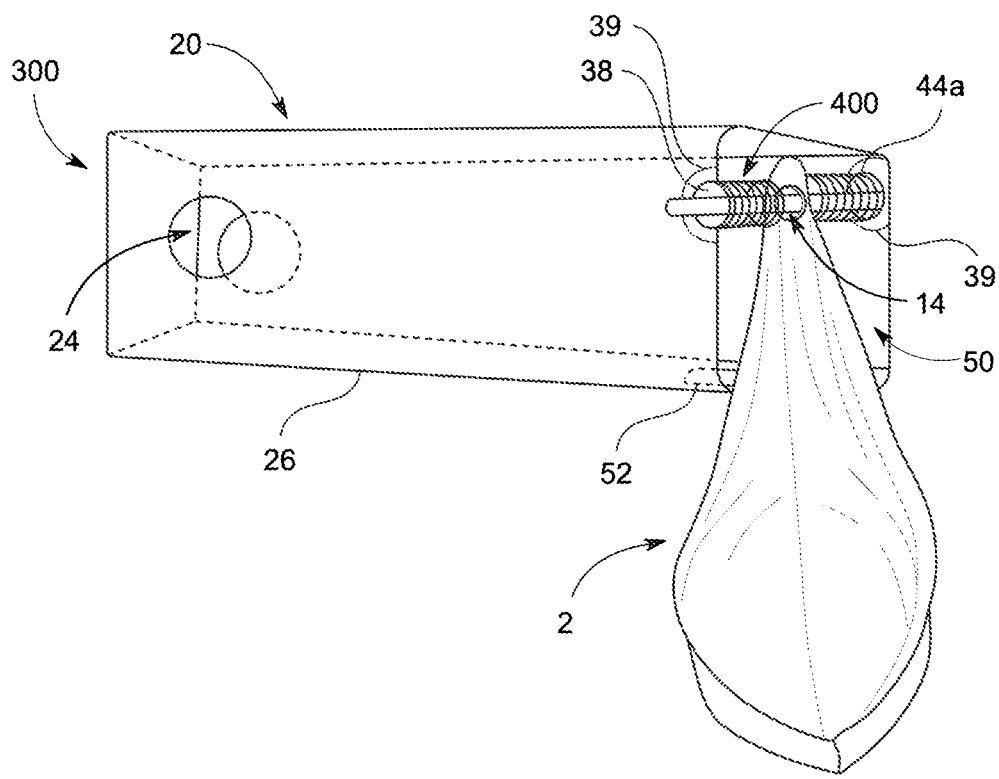
FIG. 3 is a perspective view of the embodiment of FIG. 2 positioned along the width of an insert tube main body.

Referring to FIGS. 2 and 3, FIGS. 2 and 3 illustrate one embodiment of an elongated spring member assembly 400, and when connected to the insert tube main body 20, forms one embodiment of the tow hitch cover spring assembly, where the elongated member 2 can bounce, oscillate or sway relative to the insert tube main body 20. The insert tube main body 20 has an insert tube main body channel 50 along the length of the insert tube main body 20. The insert tube main body 20 is adapted to fit within the hitch tube opening 32. A rod 38, which can be a bolt, is disposed within the insert tube main body channel 50. The embodiment has springs, which may include a first spring member 44a, and a second spring member 44b that sandwich the top region of the elongated member 12. The first spring member 44a and the second spring member 44b allow the elongated member 2 to oscillate and bounce along the rod 38, thereby giving the appearance of natural body part movement to the elongated member 2. To secure the rod 38 to insert tube main body 20, there can be a bolt head 48, opposite a nut 49. The bolt head 48 is adjacent the second washer 46b, and the nut is adjacent a first washer 46a. A third washer 56a and fourth washer 56b are adjacent opposite sides of the top region of the elongated member 12 between the springs 44a, 44b and the elongated member 2. The bolt 38 has a threaded region 42 where the nut 49 can be threaded and tightened to the bolt 38. The rod 38 can be inserted through a proximal end hole 39 in the proximal end 18 of the insert tube main body 20 so that the bolt 38 can be secured through the insert tube main body 20. Though not depicted in FIG. 3 and the insert tube main body 20 can extend beyond the elongated member spring assembly 400, but is shown as cut off at that position to so the entirety of the elongated member spring assembly 400 and elongated member 2 can be see in full view.

The insert tube main body bottom side 26 may have an insert tube main body opening or slot 52 so that the elongated member 2 has space to dangle and swing along the width and/or length of the insert tube main body 20. In the spring assembly with insert tube along the width embodiment 300 as shown in FIG. 3, the insert tube main body 20 can be inserted in the same way as previously described and shown in FIG. 1.

Figure 4:
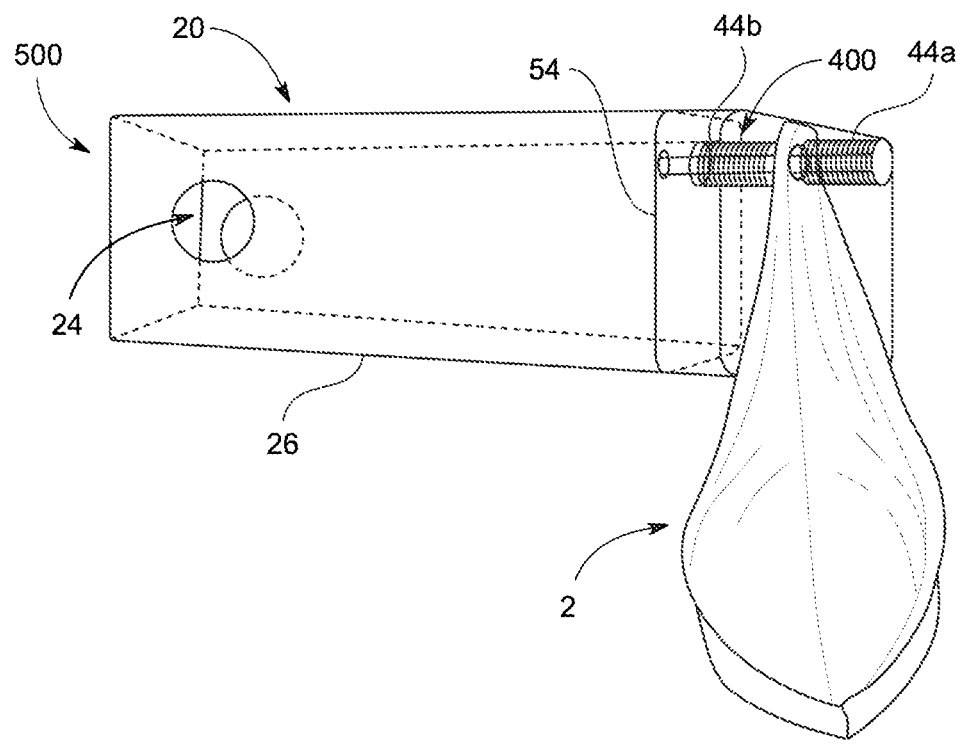
FIG. 4 is a perspective view of another embodiment of the elongated member connected to the spring assembly along the length of the insert tube main body.

FIG. 4 illustrates a similar embodiment to FIG. 3, but the elongated member spring assembly 400 is positioned lengthwise instead of width-wise within the insert tube main body 20, showing the tow hitch cover spring assembly along length embodiment 500. By being placed length-wise relative to the insert tube main body 20, the elongated member 2 can swing and oscillate at least partially back and forth relative to the length of the insert tube main body 20 instead of the width. The elongated member spring assembly in FIG. 5 does not have to traverse the entirety of length of the insert tube main body 20, but can be attached to an insert tube main body panel 54 that is positioned within the insert tube main body 20.

Embodiments can be envisioned that provide the option of attaching the elongated spring member assembly 400 or tow hitch cover spring assembly along length 500 in either a length-wise or width-wise orientation relative to the insert tube main body 20.

Figure 5:
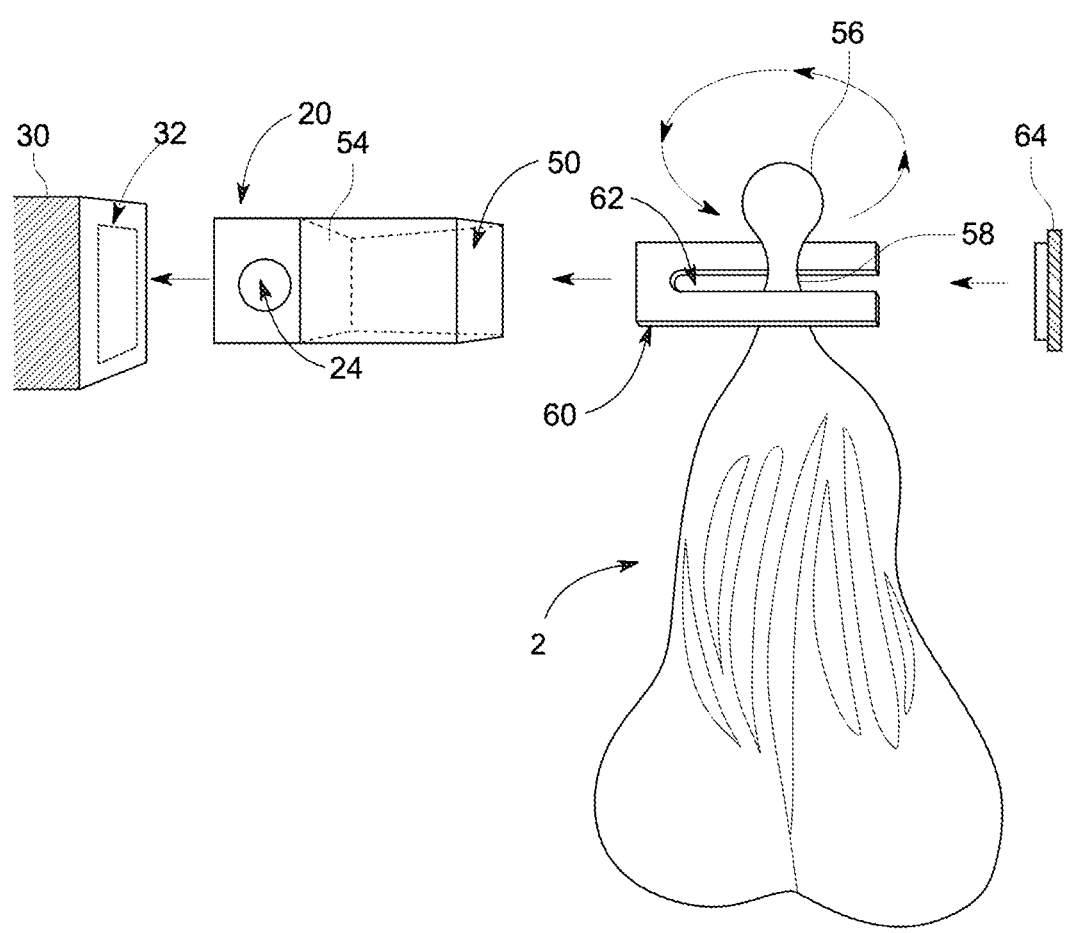
FIG. 5 is an exploded view of another embodiment of the elongated member within a slotted plate within the insert tube main body.
Figure 6:
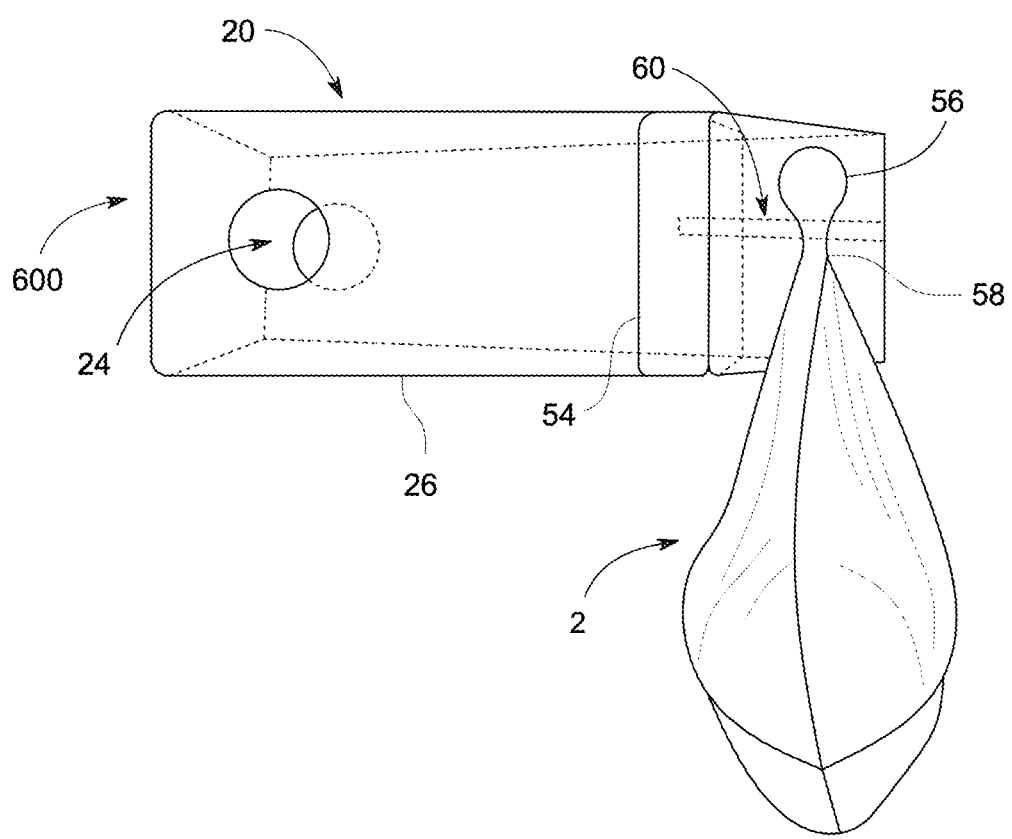
FIG. 6 is perspective view of FIG. 5, assembled within the insert tube main body.

Turning to FIGS. 5 and 6, FIGS. 5 and 6 show a swiveling elongated member embodiment 600 that allows rotation and sliding of the elongated member 2 within the insert tube main body 20. In this embodiment, the elongated member 20 has a spheroid top 56 and a neck 58 below the spheroid top 56. Also included is a plate 60 adapted to fit within the insert tube main body channel 50. The plate has an opening 62 adapted to fit the neck 58 of the elongated member 2. The diameter of the spheroid top 56 is larger than the opening 62 of the plate, thereby permitting rotational movement of the elongated member 2, but preventing the elongated member from falling through the opening 62. In one version, the plate 60 is a slotted plate 60 and the opening is a slot 62, thereby permitting rotational movement and sliding movement of the elongated member 2 along the slot 62. The insert tube main body 20 in this embodiment, as well as the other embodiments, may be covered by an insert tube main body cap 64 that fits over the end of the channel 50 of the insert tube main body 20 to close it off. The cap 64 may be welded or permanently or non-permanently secured by well known means.

The components of the invention may be made of a variety of materials, such as plastics, metals, synthetic and natural materials.

Features described above are not necessarily specific to the embodiment in which it has been described, but may be incorporated into any of the embodiments described or claimed below.

The following reference numerals are used throughout FIGS. 1-6:

2 Elongated member
4 Left side of elongated member
6 Bottom region of elongated member
8 Recess of elongated member
10 Right side of elongated member
12 Top region of the elongated member
14 Elongated member aperture
15 Elongated member coupling member
16 Front side of insert tube main body
18 Proximal end of insert tube main body
19 Top side of insert tube main body
20 Insert tube main body
22 Distal end of insert tube main body
24 Insert tube main body aperture
26 Bottom side of insert tube main body
28 Hitch tube
30 Hitch tube insertion end
32 Hitch tube opening
34 Lockpin aperture 36 Lockpin
38 Rod/Bolt
39 Proximal end hole
40 Threaded region
48 Bolt Head
49 Nut
50 Insert tube main body channel
52 Insert tube main body slot/Insert tube main body opening
54 Insert tube main body panel
56 Spheroid top of elongated member
58 Elongated member neck
60 Plate/slotted plate
62 Plate opening/slot
64 Insert tube main body cap
100 Hitch cover assembly
200 Trailer hitch assembly
300 Spring assembly with insert tube along width
400 Elongated member spring assembly
500 Tow hitch cover spring assembly along length
600 swiveling elongated member embodiment While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

What is claimed is:

1. A tow hitch insert assembly which is located under of a rear bumper in the center of a vehicle, the tow hitch insert assembly comprising:
   a) an insert tube main body having i) a proximal end, ii) a distal end, iii) a top side, iv) a bottom side, and v) an insert tube main body aperture,
      wherein the insert tube main body is adapted to fit within a hitch tube opening of a trailer hitch, and wherein the insert tube main body aperture is adapted to allow passage of a lockpin therethrough, whereby the lockpin is operable to lock the tow hitch insert assembly to the trailer hitch; and,
   b) an elongated member connected to the proximal end of the insert tube main body,
   wherein the elongated member has i) a top region, ii) a bottom region, iii) a right side, iv) a left side, and v) a recess on the bottom region at least partially separating the right side from the left side,
   wherein the elongated member top region includes an aperture and a coupling member that goes through the aperture and fixedly secures the elongated member top region to the proximal end of the insert tube main body such that the bottom region is directed downward and the elongated member does not dangle or sway relative to the insert tube main body,
   wherein the elongated member resembles animal testicles.

* * * * *